July 28, 1942.  E. T. HAGER  2,291,386

WHEEL MOUNTING DEVICE

Filed May 5, 1941  2 Sheets—Sheet 1

INVENTOR.
EDWARD T. HAGER
BY Ashlan F. Harlan Jr.
ATTORNEY.

July 28, 1942.　　　E. T. HAGER　　　2,291,386
WHEEL MOUNTING DEVICE
Filed May 5, 1941　　　2 Sheets-Sheet 2

INVENTOR.
EDWARD T. HAGER
BY
ATTORNEY.

Patented July 28, 1942

2,291,386

UNITED STATES PATENT OFFICE 2,291,386

WHEEL MOUNTING DEVICE

Edward T. Hager, Niagara Falls, N. Y.

Application May 5, 1941, Serial No. 391,842

11 Claims. (Cl. 51—168)

This invention relates to a new and improved collet or mounting device for securing wheels or pulleys on a shaft, spindle or the like.

An object of this invention is to provide means by which wheels and pulleys may be mounted upon shafts or spindles with a high order of concentricity.

A further object of this invention is to provide a collet so constructed that when it is assembled with a wheel or pulley the latter is automatically centered in the collet.

A still further object of this invention is to provide means for quickly and accurately mounting a wheel, the central opening or arbor hole of which is not as accurately dimensioned as is necessary for convenient use of the collets heretofore used.

Whenever a wheel or pulley is mounted for rotation on a shaft or spindle it is of the greatest importance that the geometric axis of rotation of the wheel or pulley be as nearly concentric as possible with the axis of rotation of the shaft or spindle. It is only thus that vibration during rotation and the noise frequently accompanying it can be kept at a minimum. While vibration during rotation by pulleys and wheels is practically always undesirable, it is particularly a problem in the use of abrasive wheels and it is therefore with respect to such wheels that the present invention will be described.

In the mounting of abrasive grinding wheels obtaining, as nearly as possible, perfect concentricity of wheel, collet and spindle is of even greater importance than it is with most other wheels. Among the several reasons for this fact only two need be considered to make it understandable. In the first place, abrasive wheels are subjected to considerable mechanical stress in performing a grinding operation and it is therefore desirable to avoid, as far as possible, the additional stresses resulting from vibration. With wheels of large diameter or relatively heavy wheels a very slight eccentricity may give rise to so much vibration that it is impossible to use the wheel.

In the second place, more often than not the abrading operation for which the abrasive wheel is to be used requires either extreme accuracy of dimension or shape or a high standard of surface finish to be imparted to the object or article being ground. Not only is an almost absolute absence of vibration necessary for the satisfactory achievement of these results but also concentricity of the wheel periphery with the wheel arbor hole and the axis of rotation of the wheel. The presently widely used expedient of "truing" the wheel periphery and so placing the weights in or on the collet that an overall balance of the wheel and collet assembly is obtained can produce satisfactory results, in the absence of such concentricity, for only a very short period of use. Obviously, as soon as any wheel wear has occurred the balance of the assembly is destroyed and chatter marks may appear on the work piece.

The collet of the present invention besides bringing about, in use, almost perfect alignment or concentricity of wheel arbor, collet and shaft or spindle is of such construction that concentricity is obtainable automatically and practically instantaneously. Moreover expense is eliminated by doing away with the necessity for a great deal of wheel "truing" and with the need for accurate dimensioning of the arbor holes of abrasive wheels.

The invention will now be more fully described in connection with the accompanying drawings, in which.

Figure 1:
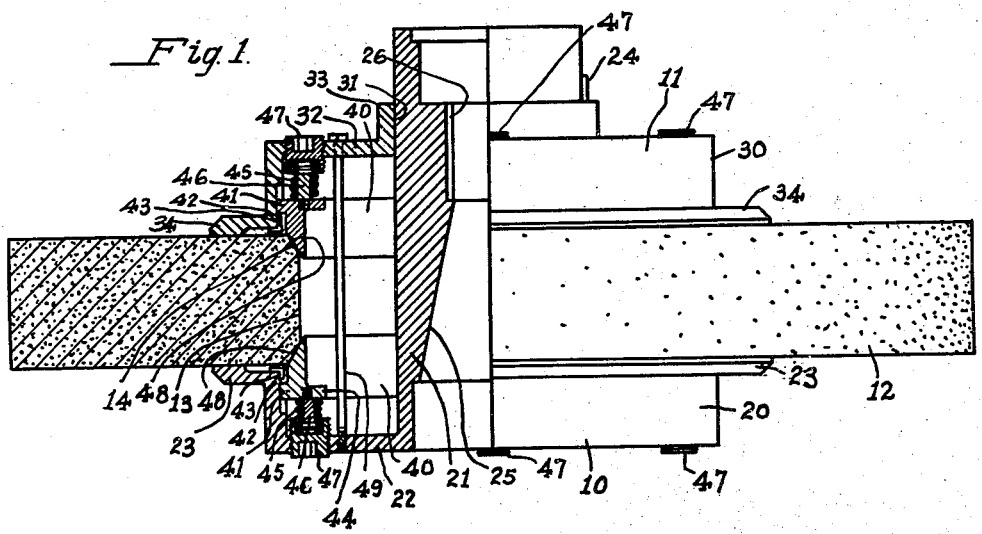
Figure 1 is a side elevation, partly in section, of an improved collet according to the present invention assembled with an abrasive wheel.
Figure 3:
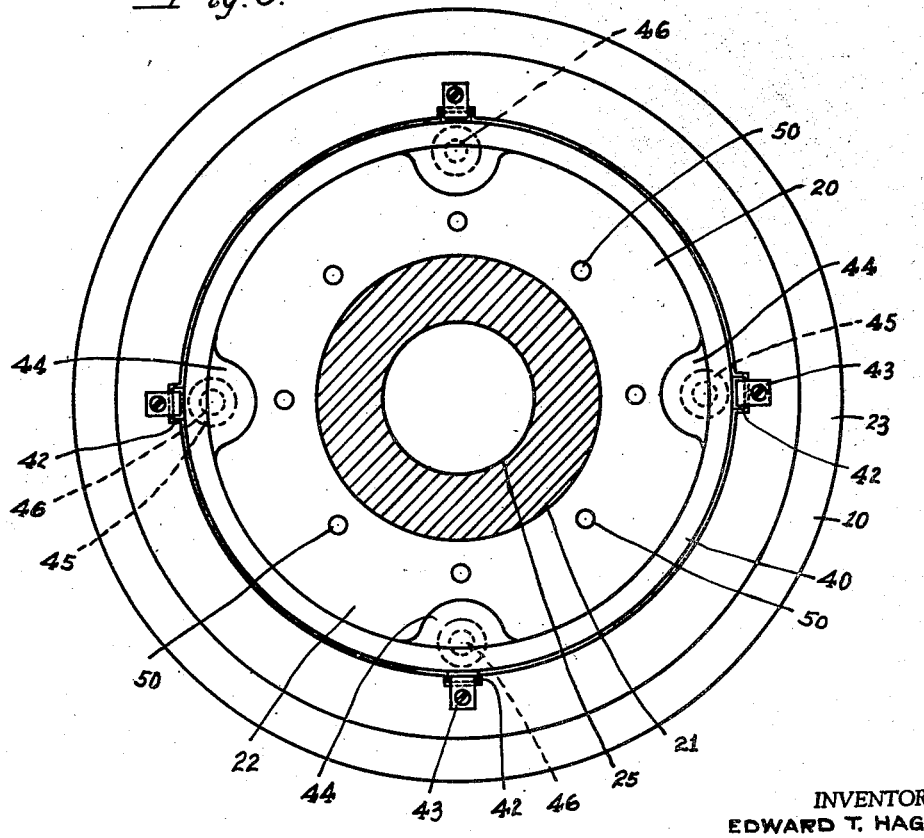
Figure 3 is a sectional view on line 3—3 of Figure 2, somewhat reduced in scale.

The wheel mounting device or collet of this invention comprises generally two principal parts, a male clamping member 10 and a female clamping member 11 between which an abrasive wheel 12 is secured.

Member 10 comprises a cup-like body portion 20 carrying a hollow hub 21 extending axially through the open end thereof from closed end 22. Adjacent to and surrounding the open end of body portion 20 is an outwardly extending annular flange 23, most conveniently made integral with said body portion.

Female member 11 comprises a cup-like body portion 30 with an axial opening 31 in the closed end 32 thereof, opening 31 being surrounded by outwardly extending boss 33 and being adapted to slidably receive and closely fit hub 21. An annular flange 34 is associated with body portion 30 in the same way as is flange 23 with body portion 20.

A centering member conveniently formed as a cylindrical ring 40 is provided in each of housings 10 and 11. Rings 40 have on their outer peripheries and preferably integral therewith a plurality of evenly spaced splines 41 or other rigid guiding means adapted for sliding movement within slots 42 in body portions 20 and 30 to prevent rotation of rings 40 relative to housings 10 and 11 while permitting axial movement therein. Suitable means such as screw-held stops 43 are provided to prevent rings 40 from coming entirely out of housings 10 and 11. Against the ends of rings 40 which extend into housings 10 and 11 and preferably against evenly spaced integral lugs 44 extending radially inward, rest springs 45 which may be guided by pins 46 attached to or mounted on lugs 44. The other ends of springs 45 rest against adjusting means such as screws 47 mounted in closed ends 22 and 32 of body portion 20 and 30.

Figure 2:
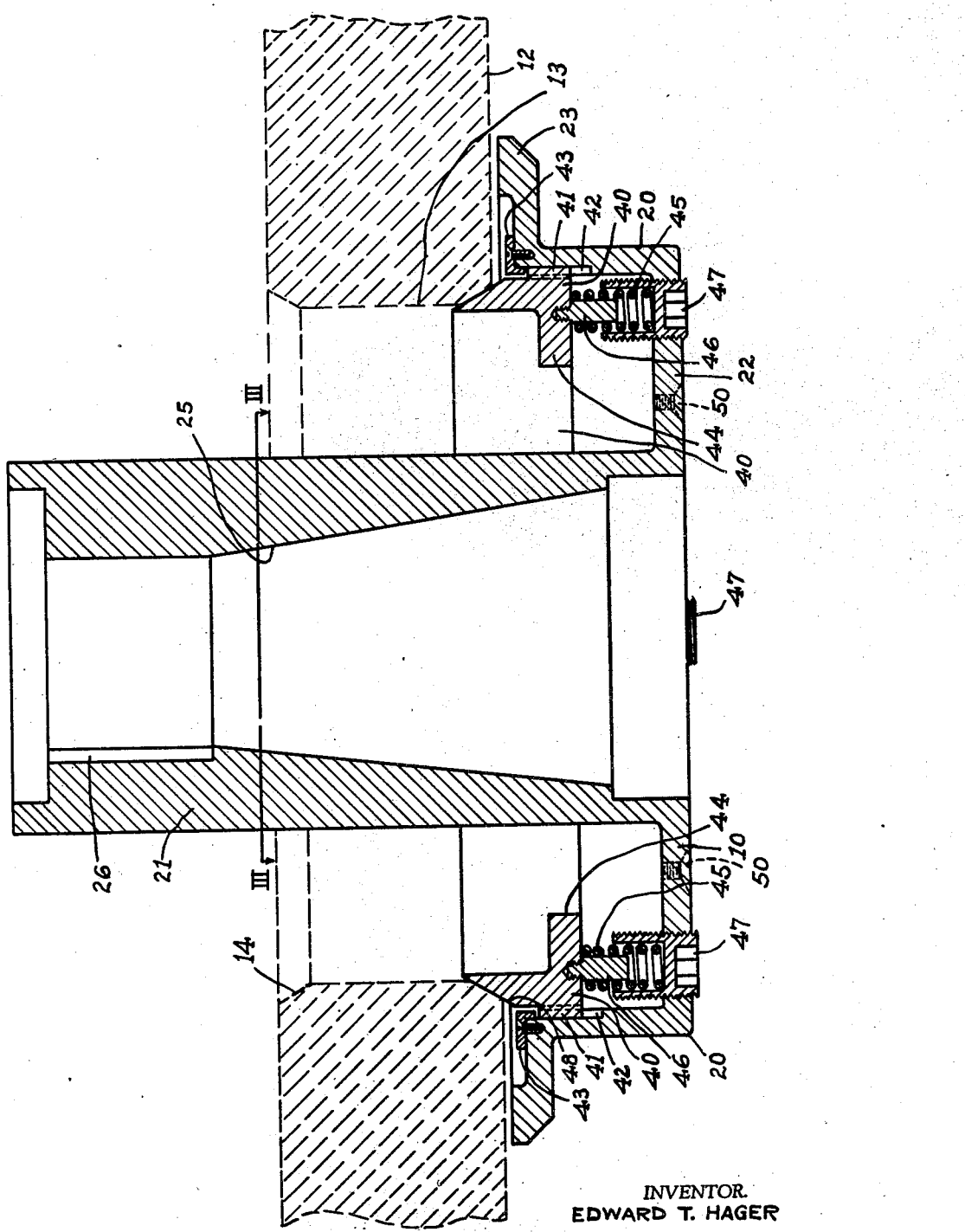
Figure 2 is an enlarged sectional view of the male member of the collet.

Mounting a wheel with a collet constructed in accordance with the present invention is a very simple operation. Male member 10 is placed, closed end down, on a bench or other suitable support. Abrasive wheel 12 is then placed over hub 21 and allowed to rest on centering ring 40, the outside periphery of which is beveled as at 48 so that the extending end of the ring will enter arbor hole 13 of wheel 12. In Figure 2 wheel 12 (partially broken away) is shown in dotted lines occupying the position assumed when being mounted. As has been pointed out, centering ring 40 is urged outwardly by adjustable springs 45 the tension on which is preferably such that the weight of wheel 12 resting on ring 40 will compress springs 45 enough to allow the wheel to come gently to rest on flange 23. Wheel 12 is thus automatically centered on the male member 10 of the collet.

Continuing the assembly of wheel and collet, hollow boss 33 of female member 11 is placed over hub 21 of member 10 and member 11 is then slid down into contact with wheel 12. The centering ring 40 in member 11 is guided into arbor hole 13 by beveled portion 48 and thus insures concentricity of both portions of the collect and the wheel. Members 10 and 11 are then secured together by suitable clamping means such as bolts 49 extending through bolt holes 50 which are evenly spaced around the circumference of closed ends 22 and 32 of housings 20 and 30, respectively. Bolt holes 50 are brought into alignment by means of a key 24 on the outside of hub 21 which is received in a properly placed keyway (not shown) in boss 33.

Hub 21 which is preferably integral with housing 20 is formed as a tube to provide a shaft-receiving bore 25. A keyway 26 may be provided in bore 25 to cooperate with a key on a shaft for preventing rotation of the collet with relation to the shaft.

While in the foregoing description of the present invention centering rings 40 have been described in connection with both members 10 and 11 of the collet, the use of two such rings is not always necessary. Except in the case of particularly heavy wheels only one centering ring, preferably associated with the male member of the collet, will be required with wheels having arbor holes of relatively small diameter, i. e., less than six inches. If a centering ring is used with only one member of the collet it is obvious that the other member may be much simplified in construction as compared with the construction illustrated and described herein. By providing a suitable accurate sliding fit with the member containing a centering ring satisfactory positioning of the other member can be secured.

It may also be mentioned here that while arbor hole 13 of abrasive wheel 12 has, in the drawings, been shown as being counterbored to provide beveled bearing portions 14 adapted to give a surface contact with beveled portions 48 of centering rings 40 and such counterboring is desirable, it is not necessary.

The advantages of a wheel mounting device or collet constructed in accordance with the present invention will in the light of the foregoing description be readily perceived. Expense in manufacture of the collet is kept to a minimum by the fact that accuracy in fit is required only between splines 41 on rings 40 and guiding slots 42 therefor and between the outside of hub 21 and the inside of boss 33 on female member 11. A high order of concentricity is automatically obtained in assembling the wheel with the collet and the degree of perfection obtainable is limited only by the trueness of the wheel arbor hole and the perfection of fit between the parts above mentioned. This fit can easily be made extremely accurate.

The above-mentioned and other advantages of the improved collet of the present invention manifest themselves in measurable reductions in operating costs. Much time is saved in mounting wheels and the virtual elimination of vibration and establishment of more nearly constant grinding machine conditions make possible more uniform grinding results, better duplication of work and far greater opportunity for the grinding wheel manufacturer to determine and specify the correct grinding wheel for the particular job. The lack of necessity for accurate dimensioning of the arbor holes in grinding wheels is also a factor contributing to economy.

It will be obvious to anyone skilled in the art that the apparatus herein described is merely illustrative and that many changes and modifications may be made therein without departing from the spirit and teaching of the present invention. Thus for example, it will be realized that the number of lugs 44, springs 45, splines 41, slots 42, bolts 49, etc., may vary depending upon the size of the collet. It is therefore desired not to be limited by the specific apparatus illustrated and described but only by the scope of the appended claims.

I claim:

1. In a wheel mounting device: a pair of housings; each of said housings comprising a cup-like body portion having at its open end an outwardly extending annular flange portion integral therewith; an axially movable centering ring within each housing having one end thereof extending outwardly from said housing; the outwardly extending ends of said rings being beveled on their outer peripheries; the inner ends of said rings being provided with rigid splines slidably fitting within guiding slots in said body portions and being retained therein by detachable means; said inner ends also having a plurality of integral lugs extending radially inwardly; springs, bearing between said lugs and screw-threaded adjusting means carried by said body portions, whereby said rings are urged outwardly from the housings; each of said housings being provided with holes for receiving clamping bolts; and one of said housings having an axially extending shaft-receiving hub portion adapted to be slidably and non-rotatably received by a tubular boss projecting axially from the other of said housings.

2. In a wheel mounting device: a pair of housings; each of said housings comprising a cup-like body portion having at its open end an outwardly extending annular flange integral therewith; an axially movable centering ring within each housing having one end thereof extending outwardly from said housing; the outwardly extending ends of said rings being beveled on their outer peripheries; the inner ends of said rings being provided with rigid splines removably held in and slidably engaging guiding slots in said body portions; said inner ends also having a plurality of integral lugs; springs, situated between and bearing against said lugs and spring adjusting means carried by said body portions, whereby said rings are urged outwardly from the housings; each of said housings being provided with a plurality of means for receiving clamping means;

and one of said housings having an axially extending shaft-receiving hub adapted to be slidably received by a centrally disposed tubular portion of the other of said housings.

3. A mounted wheel assembly comprising: a wheel having a central arbor hole; a pair of housings; each of said housings comprising a cup-like body portion having at its open end an integral, outwardly extending annular flange bearing against the sides of said wheel; an axially movable centering ring within each housing having one end thereof extending outwardly from said housing into said arbor hole, said outwardly extending ends being beveled on their outer peripheries; the inner ends of said rings being provided with rigid splines removably held in and slidably engaging guiding slots in said body portions; said inner ends also having a plurality of integral lugs; springs, situated between and bearing against said lugs and spring adjusting means carried by said body portions, whereby said rings are urged toward each other and into engagement with the wall of said arbor hole; clamping means passing through said arbor hole and rigidly holding said housings together and in engagement, through said flanges, with said wheel; and one of said housings having a shaft-receiving hub slidably fitting within an axially disposed orifice in the other of said housings.

4. In a self-centering wheel mounting device: a pair of housings; each of said housings comprising a cup-like body portion having at its open end an outwardly extending annular flange; an axially movable centering ring within each housing having one end thereof extending outwardly from said housing; said outwardly extending ends being beveled on their outer peripheries; the inner ends of said rings being provided with guiding means slidably engaging said body portions and further provided with a plurality of spring-bearing portions; springs, situated between and operatively contacting said bearing portions and spring adjusting means carried by said body portions, whereby said rings are urged outwardly from their associated housings; each of said housings being provided with means for receiving clamping means and one of said housings having a shaft-receiving hub slidably fitting within an axially disposed orifice in the other of said housings.

5. In a self-centering collet: a pair of housings; each of said housings comprising a body portion having an open end and an outwardly extending annular flange adjacent to said open end; a centering ring axially movable within each housing and having an end extending therefrom; said extending ends being beveled on their outer peripheries; the inner ends of said rings being provided with guiding means slidably engaging said body portions; a plurality of springs in each housing bearing against said rings and spring-adjusting means carried by said body portions, whereby said rings are urged outwardly from their associated housings; each of said housings having means adapted to cooperate in securing said housings together and one of said housings having a shaft-receiving hub slidably fitting within an axially disposed orifice in the other of said housing.

6. In a self-centering collet; a pair of housings; each of said housings comprising a body portion having an outwardly extending annular flange adjacent to an open end thereof; and each housing containing a centering ring slidably movable axially therein and having an end extending from said housing; the extending ends of said rings being beveled on their outer peripheries; a plurality of adjustable springs urging said rings outwardly from their associated housings; one of said housings having a shaft-receiving hub adapted to pass axially through and slidably engage the other of said housings; and means for securing said housings together.

7. A mounted wheel assembly comprising: a wheel having a central arbor hole; a pair of housings; each of said housings comprising a body portion and an outwardly extending annular flange portion bearing against a side of the wheel; each of said housings containing a ring having a beveled portion extending into the arbor hole of and centering said wheel and being slidably movable in said housing; adjustable spring means urging said rings toward each other and into engagement with said arbor hole; means for securing said housings together on opposite sides of the wheel; and one of said housings being adapted to slidably engage a shaft-receiving hub carried by the other of said housings.

8. A self-centering wheel mounting device comprising in combination: a pair of complementary housings; each of said housings comprising a body portion and an outwardly extending annular flange; an axially movable centering ring within each of said housings; spring means operatively associated with each centering ring; said centering rings and flanges being adapted to firmly engage a wheel; and one of said housings being provided with means adapted to attach said mounting device, carrying a wheel, to a shaft.

9. A member of a self-centering collet comprising: a housing having a body portion with an open end; an outwardly extending annular flange adjacent to said open end; a centering ring axially movable within said housing and having an end extending therefrom, said extending end being beveled on its outer periphery, the inner end of said ring being provided with guiding means slidably engaging said body portion; a plurality of springs in said housing bearing against said ring and spring adjusting means carried by said body portion, whereby said ring is urged outwardly from said housing.

10. A self-centering wheel mounting device comprising a housing; said housing comprising a body portion and an outwardly extending annular flange; an axially movable centering ring within said housing, resilient means operatively associated with said centering ring, said centering ring and flange being adapted to firmly engage a wheel; and means operatively associated with said housing adapted to attach said mounting device, carrying a wheel, to a shaft.

11. A self-centering wheel mounting device comprising two wheel-engaging members; at least one of said members comprising a housing comprising a body portion and an annular flange extending radially outward from said body portion; an axially movable centering ring within said housing, resilient means operatively associated with said centering ring and urging said ring outwardly from said housing; said wheel-engaging members being adapted to firmly engage a wheel, engagement by at least one of said members being through said centering ring and annular flange; and means operatively associated with one of said wheel-engaging members adapted to mount said mounting device, carrying a wheel, on a shaft.

EDWARD T. HAGER.